United States Patent
Shanks et al.

(10) Patent No.: US 10,356,085 B2
(45) Date of Patent: Jul. 16, 2019

(54) REMOTE PUMP MONITORING AND CONTROL

(71) Applicant: Graco Minnesota Inc., Minneapolis, MN (US)

(72) Inventors: Kelly L. Shanks, Eagan, MN (US); Theodore J. Stone, St. Louis Park, MN (US); Jeffrey T. Keacher, Denver, CO (US)

(73) Assignee: Graco Minnesota Inc., Minneapolis, MN (US)

( * ) Notice: Subject to any disclaimer, the term of this patent is extended or adjusted under 35 U.S.C. 154(b) by 193 days.

(21) Appl. No.: 15/140,747

(22) Filed: Apr. 28, 2016

(65) Prior Publication Data
US 2016/0319826 A1 Nov. 3, 2016

Related U.S. Application Data

(60) Provisional application No. 62/155,580, filed on May 1, 2015.

(51) Int. Cl.
*H04W 4/02* (2018.01)
*F04D 15/00* (2006.01)
(Continued)

(52) U.S. Cl.
CPC ........ *H04L 63/083* (2013.01); *F04D 15/0088* (2013.01); *H04L 63/062* (2013.01);
(Continued)

(58) Field of Classification Search
CPC ..... H04L 63/083; H04L 63/18; H04L 63/062; H04L 67/125; H04L 67/42; H04L 67/02; F04D 15/0088; G05B 15/02
(Continued)

(56) References Cited

U.S. PATENT DOCUMENTS

| 5,406,970 A | 4/1995 | Marshall et al. |
| 6,208,913 B1 | 3/2001 | Marshall et al. |

(Continued)

OTHER PUBLICATIONS

International Preliminary Report on Patentability for PCT Application No. PCT/US2016/029689, dated Nov. 16, 2017, 13 pages.
(Continued)

*Primary Examiner* — Ziaul Karim
(74) *Attorney, Agent, or Firm* — Kinney & Lange, P.A.

(57) ABSTRACT

A system includes a pump controller, a user device, and a server. The pump controller transmits identity information via a first communication connection with the pump controller. The server validates the identity information in response to determining that characteristics of the identity information satisfy one or more predetermined validity criteria that are different than the identity information. The pump controller establishes a second communication connection with the server using authentication credentials generated by the server and transmitted to the pump controller in response to validating the identity information. The server transmits a unique activation code to the pump controller via the second connection. The pump controller displays the activation code. A user device associated with a user account transmits the activation code to the server. The server authorizes remote communications with the pump controller via the user account in response to determining that the activation request includes the activation code.

20 Claims, 4 Drawing Sheets

(51) Int. Cl.
*H04L 29/06* (2006.01)
*H04L 29/08* (2006.01)

(52) U.S. Cl.
CPC .............. *H04L 63/18* (2013.01); *H04L 67/02* (2013.01); *H04L 67/125* (2013.01); *H04L 67/42* (2013.01); *H04W 4/02* (2013.01)

(58) Field of Classification Search
USPC ................................................ 700/282–300
See application file for complete search history.

(56) References Cited

U.S. PATENT DOCUMENTS

| | | | |
|---|---|---|---|
| 7,320,749 B2 | 1/2008 | Speece et al. | |
| 7,632,402 B2 | 12/2009 | King et al. | |
| 8,580,125 B2 | 11/2013 | Clidence et al. | |
| 8,585,892 B2 | 11/2013 | Robertson et al. | |
| 8,958,917 B2 | 2/2015 | Wolfe et al. | |
| 9,778,626 B2 * | 10/2017 | Nixon | G06F 3/04842 |
| 2001/0014840 A1 | 8/2001 | Marshall et al. | |
| 2004/0153245 A1 | 8/2004 | Womer et al. | |
| 2004/0231851 A1 | 11/2004 | Silvers | |
| 2009/0055029 A1 | 2/2009 | Roberson et al. | |
| 2009/0107921 A1 | 4/2009 | Chen et al. | |
| 2010/0312401 A1 | 12/2010 | Gutierrez et al. | |
| 2011/0191833 A1 * | 8/2011 | Yi | G07C 9/00857 726/5 |
| 2014/0163749 A1 * | 6/2014 | Phillips | G05D 7/0676 700/283 |
| 2014/0202929 A1 | 7/2014 | Mason et al. | |
| 2014/0282257 A1 * | 9/2014 | Nixon | G05B 11/01 715/835 |
| 2015/0090645 A1 | 4/2015 | Black et al. | |
| 2015/0105909 A1 | 4/2015 | Gutierrez et al. | |

OTHER PUBLICATIONS

Written Opinion & International Search Report, for PCT Application No. PCT/US2016/029689, dated Aug. 10, 2016, 16 pages.

* cited by examiner

REMOTE PUMP MONITORING AND CONTROL

CROSS-REFERENCE TO RELATED APPLICATION

This application claims priority to U.S. Provisional Application No. 62/155,580 filed on May 1, 2015, and entitled "REMOTE PUMP MONITORING AND CONTROL," the entire contents of which are hereby incorporated by reference in their entirety.

BACKGROUND

Many commercial and industrial systems require accurate and precise delivery of fluid throughout or at various stages of a controlled process. Often, such systems utilize a pump controller device that manages operation of a pump to deliver the required amount of fluid. The pump controller, typically co-located with the pump, often includes a user interface that enables user interaction to monitor and control operations of the pumping system. Remote access to the pump controller via, e.g., the Internet, can be desirable to enable remote monitoring and control of the pumps from geographically disparate locations. It is important to secure such remote access to the pump controller against unauthorized monitoring and control communications. Security schemes that authorize remote communications using, e.g., a list of known pump controller serial numbers, can burden the manufacturing process by requiring the generation and maintenance of a database of known pump controller serial numbers prior to commissioning of the pump controllers in the field, thereby increasing the manufacturing cost of pump controller devices.

SUMMARY

In one example, a pump controller includes one or more processors, a communication device, a display device, and computer-readable memory. The computer-readable memory is encoded with instructions that, when executed by the one or more processors, cause the pump controller to transmit, to a server, identity information of the pump controller via a first communication connection between the pump controller and the server established using the communication device. The computer-readable memory is further encoded with instructions that, when executed by the one or more processors, cause the pump controller to receive, from the server, authentication credentials for establishing a second communication connection between the pump controller and the server, and establish the second connection with the server, via the communication device, using the authentication credentials. The computer-readable memory is further encoded with instructions that, when executed by the one or more processors, cause the pump controller to receive, from the server, a unique activation code via the second communication connection, and display, at the display device, the unique activation code. The computer-readable memory is further encoded with instructions that, when executed by the one or more processors, cause the pump controller to receive remote communications from the server via the second communication connection, the remote communications originating from a remote device, control the pump according to operational instructions included in the remote communications, and report operational state information of the pump to the server via the second communication connection.

In another example, a method includes receiving, by a server, identity information from a pump controller via a first communication connection between the server and the pump controller. The method further includes validating, by the server, the identity information in response to determining that characteristics of the identity information satisfy predetermined validity criteria that are different than the identity information. The method further includes establishing a second communication connection between the server and the pump controller using authentication credentials generated by the server in response to validating the identity information, and transmitting, by the server, a unique activation code to the pump controller via the second communication connection. The method further includes receiving, by the server, an activation request that includes the unique activation code from a user device associated with a user account, and authorizing, by the server, remote communication with the pump controller via the user account in response to determining that the activation request includes the unique activation code.

In another example, a system includes a pump controller, a user device, and a server. The server is configured to receive identity information from the pump controller via a first communication connection between the server and the pump controller, validate the identity information in response to determining that characteristics of the identity information satisfy predetermined validity criteria that are different than the identity information, and establish a second communication with the pump controller using authentication credentials generated by the server in response to validating the identity information. The server is further configured to transmit a unique activation code to the pump controller via the second communication, receive an activation request that includes the unique activation code from the user device associated with a user account, and authorize remote communications with the pump controller via the user account in response to determining that the activation request includes the unique activation code.

DETAILED DESCRIPTION

According to techniques of this disclosure, a pump controller is authorized for remote monitoring and control through a two-part secure activation scheme that associates the pump controller with a user account without requiring prior knowledge of unique identity information associated with the pump controller. As described herein, a pump controller can transmit identity information to a server via a first communication connection between the server and the pump controller. The server can validate the identity information in response to determining that characteristics of the identity information satisfy one or more predetermined validity criteria, such as a predetermined range of identification numbers, a predetermined form of the identity information, or other validity criteria. As such, the server can validate the identity information without requiring prior knowledge of the identity information in the form of, e.g., a database of valid identity numbers, thereby decreasing the time and costs associated with storing and maintaining a database of such predefined validity information.

In response to validating the identity information, the server transmits authentication credentials to the pump controller for establishing a second communication connection that is utilized for remote monitoring and control of the pump. The second communication connection, through the use of the authentication credentials, can be considered more secure than the first connection (which does not require the use of the authentication credentials). In some examples, the second communication connection can be a lightweight connection that helps to minimize the amount (and associated cost) of data transferred over the second connection, which may be a cellular, satellite, or other wireless connection.

The server generates and transmits a unique activation code to the pump controller via the second, secure communication connection. The pump controller displays the unique activation code at a display device of the pump controller. The unique activation code can be read (e.g., visually read) by a user that may be physically proximate the pump controller. The user, having logged into a user account maintained by the server via a remote device (e.g., a laptop computer, a smartphone, a tablet computer, or other computing device) can transmit an activation request including the activation code from the remote device to the server. The server authenticates the activation request in response to determining that the request includes the unique activation code associated with the pump controller. The server authorizes communications with the pump controller via the user account for remote monitoring and control of the pump controller via any one or more remote devices that are logged into the user account maintained by the server. As such, techniques of this disclosure can enable secure access for remote monitoring and control of a pump controller without requiring prior knowledge of unique identity information associated with the pump controller.

Figure 1:
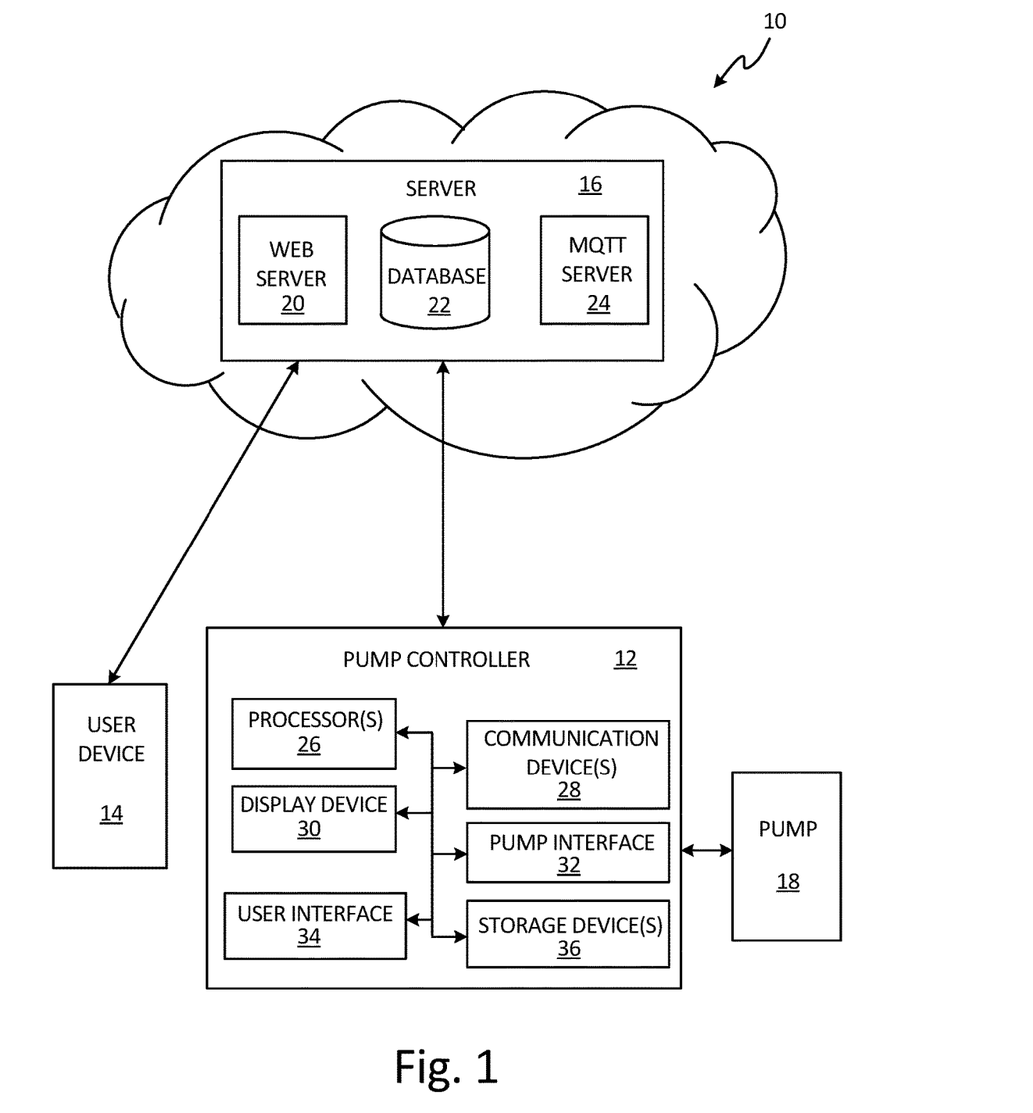
FIG. 1 is a schematic block diagram of an example system that can activate a pump controller for remote monitoring and control via a remote device.

FIG. 1 is a schematic block diagram of system 10 that can activate pump controller 12 for remote monitoring and control via user device 14. As illustrated in FIG. 1, system 10 further includes server 16 and pump 18. Server 16 includes web server 20, database 22, and MQ Telemetry Transport (MQTT) server 24. Pump controller 12 includes processor(s) 26, communication device(s) 28, display device 30, pump interface 32, user interface 34, and storage device(s) 36.

Pump 18 is a reciprocating, rotary, or other type of pump that is configured to draw fluid (including slurries of mixed fluid and solid material) through an inlet of pump 18 and discharge the fluid through an outlet of pump 18. Pump controller 12 can be any electronic device including processing circuitry and computer-readable memory configured to communicate with server 16 and control operation of pump 18 according to techniques described herein. Pump controller 12, as illustrated in FIG. 1, is connected to pump 18 to control operation thereof. For example, pump controller 12 can be electrically connected to a pump motor (not illustrated) integral to or otherwise operatively connected with pump 18 to drive operation of pump 18 to actively discharge fluid. For instance, pump controller 12 can be connected to supply electrical power to a motor of pump 18 to cause the motor (and hence pump 18) to operate according to an operational duty cycle determined by, e.g., pump controller 12. Pump controller 12 can be integral to or remote from pump 18.

As illustrated in FIG. 1, pump controller 12 is communicatively coupled to send and receive data with server 16 via, e.g., one or more wired or wireless communication networks, or both. In operation, pump controller 12 communicates with server 16 via the one or more communication networks to activate pump controller 12 for remote monitoring and control by user device 14 via server 16, as is further described below.

Server 16, as illustrated in FIG. 1, includes web server 20, database 22, and MQTT server 24. Server 16, some examples, is a cloud-based server system that implements functionality attributed herein to web server 20, database 22, and MQTT server 24 across multiple server devices. In other examples, server 16 can be a single server device that stores database 22 and implements web server 20 and MQTT server 24 as virtual servers executing on server 16. Examples of server 16 include any one or more computing devices, such as server computers, mainframes, desktop computers, or other computing devices.

Web server 20 can be any device, system, appliance, or virtual process that stores, processes, and delivers content in the form of, e.g., web pages to clients, such as user device 14 executing an agent such as a web browser. For example, web server 20 can deliver web pages in the form of Hyper-Text Markup Language (HTML) documents to user device 14 that communicates with web server 20 via Hypertext Transfer Protocol (HTTP), HTTP Secure (HTTPS), or other communication protocols. Web server 20 can, for example, deliver a web page to user device 14 via one or more wired or wireless communication networks (or both) that enables user device 14 to remotely monitor and control functional aspects of pump controller 12.

Database 22 can be a relational database, multi-dimensional database, hierarchical database, object-oriented database, or other type of database that can store data in computer-readable memory in an organized manner for later retrieval. Server 16 can utilize database 22 to store operational state and/or command information for pump 18 and associate pump 18 with a user account for remote monitoring and control of pump 18.

MQTT server 24 can be any device, system, appliance, or virtual process that implements the MQTT standard communication protocol for sending and receiving data with pump controller 12. The MQTT protocol is a "light weight" messaging protocol designed for use with the Transmission Control Protocol/Internet Protocol (TCP/IP) to enable low overhead communication of messages through the use of asynchronously-delivered control packets that each define an action via the predefined MQTT protocol and limit overhead (e.g., metadata or other data that is separate from the functional data to be delivered by the message) associated with the communication messages. Example control packets include, but are not limited to, a connect control packet that indicates a request by an MQTT client (e.g., executing on pump controller 12) to initiate a communication connection with MQTT server 24, a publish control packet that publishes data via an established connection between MQTT server 24 and the MQTT client, a subscribe control packet indicating a request by the MQTT client to receive published messages from MQTT server 24, and a disconnect message indicating that the MQTT client is disconnecting from MQTT server 24.

While illustrated and described in the example of FIG. 1 as including MQTT server 24 that implements the MQTT lightweight communication protocol, in some examples, server 16 may not include MQTT server 24. In such examples, server 16 can implement a different lightweight communication protocol, such as the Lightweight Directory Access Protocol (LDAP), the Lightweight Extensible Authentication Protocol (LEAP), the Internet Content Adaptation Protocol (ICAP), or other lightweight communication protocol designed to limit the overhead of communications. In certain examples, server 16 may not implement a lightweight communication protocol for communications with pump controller 12. Rather, in such examples, server 16 may communicate with pump controller 12 via HTTP, HTTPS, or other communication protocols.

User device 14 can be any computing device including processing circuitry and computer-readable memory encoded with instructions that, when executed by the processing circuitry, cause user device 14 to operate in accordance with techniques described herein. Examples of user device 14 include, but are not limited to, mobile phones (including smartphones), laptop computers, tablet computers, desktop computers, personal digital assistants (PDAs), servers, mainframes, or other computing devices.

Pump controller 12, as illustrated in FIG. 1, includes processor(s) 26, communication device(s) 28, display device (30), pump interface 32, user interface 34, and storage device(s) 36. Processor(s) 26, in one example, are configured to implement functionality and/or process instructions for execution within pump controller 12. For instance, processor(s) 26 can be capable of processing instructions stored in storage device(s) 36. Examples of processor(s) 26 can include any one or more of a microprocessor, a controller, a digital signal processor (DSP), an application specific integrated circuit (ASIC), a field-programmable gate array (FPGA), or other equivalent discrete or integrated logic circuitry.

Pump controller 12, in one example, utilizes communication device(s) 28 to communicate with external devices via one or more networks, such as one or more wired or wireless networks or both. Communications device(s) 28, in some examples, can include discrete and/or analog circuitry configured to send and receive data according to a defined communication protocol. In certain examples, communications device(s) 28 can be a network interface card, such as an Ethernet card, an optical transceiver, a radio frequency transceiver, a cellular modem, a satellite modem, or any other type of device that can send and receive information. Other examples of such network interfaces can include Bluetooth, 3G, 4G, and WiFi radio communication devices, as well as Universal Serial Bus (USB). Communication device(s) 28 can be associated with a unique identification information, such as a unique identification code (e.g., unique identification number, unique identification alphanumeric string, or other unique identification code). For instance, in one example, communication device(s) 28 includes a cellular modem associated with a globally unique international mobile subscriber identity (IMSI) number. In certain examples, the unique identification information can include a unique alpha-numeric information (i.e., including both numbers and characters).

Display device 30 can be a liquid crystal display (LCD), e-ink, cathode ray tube (CRT), light emitting diode (LED), organic light emitting diode (OLED), or other display device that is integral to or otherwise communicatively coupled with pump controller 12. Display device 30 can display the output of applications executing on processor(s) 26 for presentation to a user. For instance, display device 30 can display graphical content generated by user interface 34 to enable user interaction with pump controller 12 and/or other components of system 10. In some examples, display device 30 can implement some or all of the functionality of a user interface of pump controller 12 (e.g., user interface 34). For instance, display device 30 can be a touch-sensitive and/or presence-sensitive display that can display a graphical user interface (GUI) and detect input from a user in the form of user input gestures (e.g., touch gestures, swipe gestures, pinch gestures, and the like) using capacitive or inductive detection at or near display device 30. In one example, display device 30 displays a unique activation code for activation of remote monitoring of pump controller 12 that can be read by a user, as is further described below.

Pump interface 32 includes computer-readable instructions and/or hardware components for interfacing with pump 18. Pump controller 12 utilizes pump interface 32 to transmit data to and from pump 18, a motor operatively coupled with pump 18, and/or sensors operatively coupled with pump 18. Pump interface 32, in some examples, utilizes communication device(s) 28 for communication with pump 18. In certain examples, pump interface 32 can include electrical relays for controlling power available to pump 18 (or a motor operatively coupled with pump 18) to drive pump 18 according to, e.g., an operational duty cycle.

User interface 34 can be any graphical and/or mechanical interface that enables user interaction with pump controller 12 and/or other components of system 10. For example, user interface 34 can implement a graphical user interface displayed at display device 30 for presenting information to and/or receiving input from a user. User interface 20 can include graphical navigation and control elements, such as graphical buttons, a graphical keyboard (e.g., a "soft keyboard"), or other graphical control elements presented at display device 30. User interface 34, in some examples, includes physical navigation and control elements, such as physically-actuated buttons, a keyboard, or other physical navigation and control elements. In general, user interface 34 can include any input and/or output devices and control elements that can enable user interaction with pump controller 12 and/or other components of system 10.

Storage device(s) 36 can be configured to store information within pump controller 12 during operation. Storage device(s) 36, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 36 are a temporary memory, meaning that a primary purpose of storage device(s) 36 is not long-term storage. Storage device(s) 36, in some examples, are described as volatile memory, meaning that storage device(s) 36 do not maintain stored contents when power to pump controller 12 is turned off. Examples of volatile memories can include random access memories (RAM), dynamic random access memories (DRAM), static random access memories (SRAM), and other forms of volatile memories. In some examples, storage device(s) 36 are used to store program instructions for execution by processor(s) 26. Storage device(s) 36, in one example, are used by software or applications running on pump controller 12 to temporarily store information during program execution.

Storage device(s) 36, in some examples, also include one or more computer-readable storage media. Storage device(s) 36 can be configured to store larger amounts of information than volatile memory. Storage device(s) 36 can further be configured for long-term storage of information. In some examples, storage device(s) 36 include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

In operation, server 16 associates pump controller 12 with a user account through a two-part activation scheme to authorize remote access to pump controller 12 for monitoring and control of pump 18 via a remote device (e.g., user device 14), as is further described below. Server 16 can validate identity information provided by pump controller 12 based on one or more validity criteria that are different than the identity information. As such, server 16 can validate an identity of pump controller 12 prior to establishing secure communications for remote access and control without requiring a database or other list including known identity information of authorized pump controllers. Accordingly, techniques of this disclosure can decrease the time and cost of establishing and maintaining a database of such identity information during, e.g., a manufacturing process of pump controllers. The secure two-part activation scheme, utilizing an activation code that is unique to a particular pump controller (e.g., pump controller 12), can help to prevent unauthorized monitoring and/or control of pump controller 12.

Figure 2A:
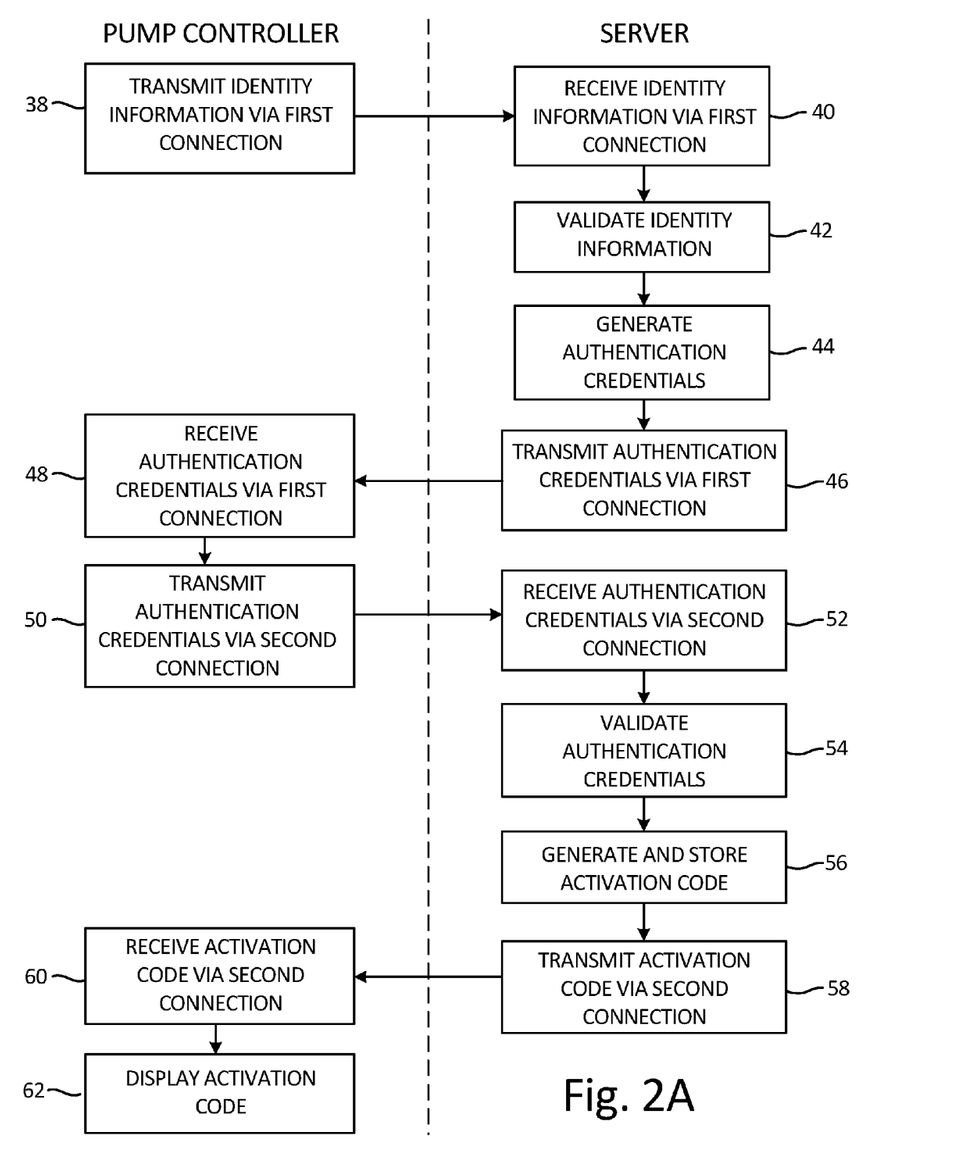
FIG. 2A is a flow diagram illustrating example operations to generate and display a unique activation code for activating a pump controller for remote monitoring and control.
Figure 2B:
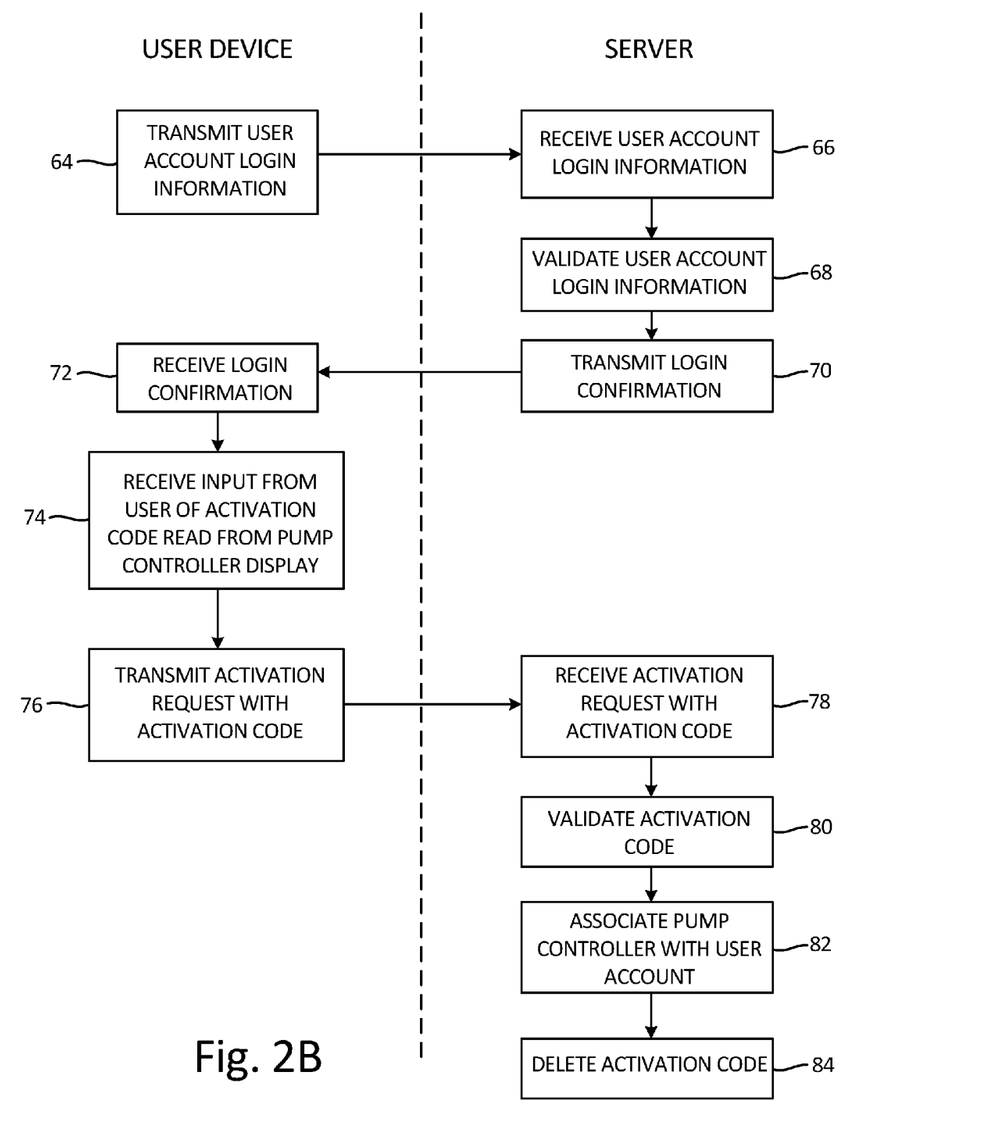
FIG. 2B is a flow diagram illustrating example operations to validate the activation code and associate the pump controller with a user account for remote monitoring and control.
Figure 2C:
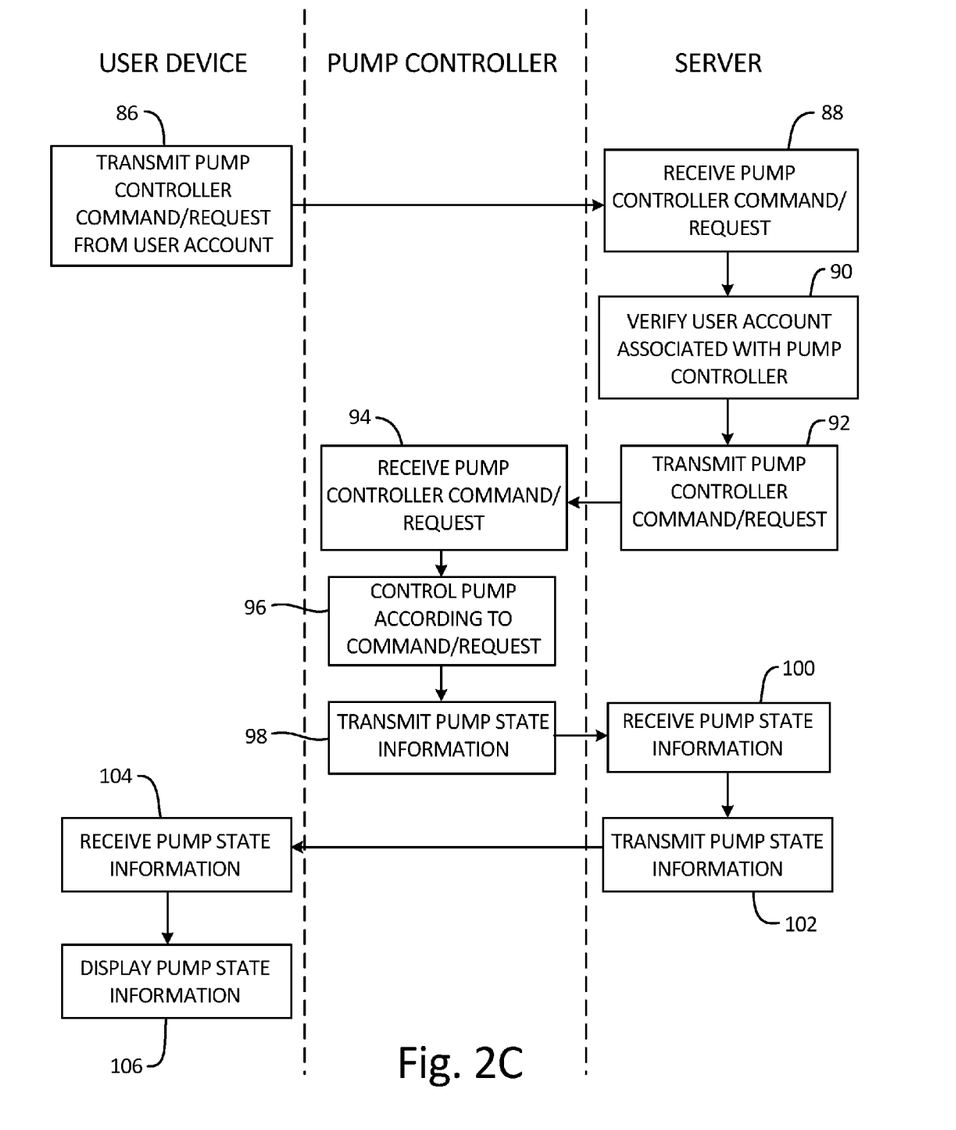
FIG. 2C is a flow diagram illustrating example operations to remotely monitor and control a pump controller via a remote device.

FIGS. 2A, 2B, and 2C are flow diagrams illustrating example operations to activate a pump controller for remote monitoring and control. In particular, FIG. 2A is a flow diagram illustrating example operations to generate and display a unique activation code for activating the pump controller for remote monitoring and control. FIG. 2B is a flow diagram illustrating example operations to validate the activation code and associate the pump controller with a user account for the remote monitoring and control. FIG. 2C is a flow diagram illustrating example operations to remotely monitor and control the pump controller via a remote device. For purposes of clarity and ease of discussion, the example operations of FIGS. 2A, 2B, and 2C are described below within the context of system 10 of FIG. 1.

As illustrated in FIG. 2A, identity information of the pump controller is transmitted from the pump controller to a server via a first communication connection (Step 38). For example, pump controller 12 can transmit to server 16 identity information of pump controller 12, such as a unique identification number, a unique alphanumeric string, or other identity information that uniquely identifies pump controller 12. In one example, pump controller 12 can transmit to server 16 an ISMI number (e.g., a globally unique, typically 15 digit code) that is associated with a cellular modem included in communication device(s) 28. In some examples, the identity information can include both a unique identifier of pump controller 12 and a validation code that is not unique to pump controller 12. For example, storage device(s) 36 of pump controller 12 can be encoded with a validation code during, e.g., a manufacturing process of pump controller 12. The validation code can be, for example, an alphanumeric string that identifies pump controllers manufactured by a manufacturer of pump controller 12, but which is not unique to pump controller 12 (e.g., is shared by the manufactured pump controllers generally). Pump controller 12 can transmit the identity information via a first connection with server 16, such as an HTTP connection, an HTTPS connection, or other connection with, e.g., web server 20 of server 16. As an example, upon power-up or upon user request (e.g., via user interface 34), pump controller 12 can access web server 20 using a uniform resource locator (URL) preprogrammed into storage device(s) 36 (e.g., during a manufacturing phase of pump controller 12) that accesses web server 20 via a first communication connection. Pump controller 12 can transmit the identity information (including, in some examples, the validity code) to web server 20 using the first communication connection.

The identity information is received by the server from the pump controller via the first connection (Step 40). For instance, web server 20 can receive the transmitted identity information via the first connection between pump controller 12 and web server 20. The identity information is validated by the server (Step 42). For example, server 16 can store one or more predetermined validity criteria within computer-readable memory of server 16, such as at database 22 or other computer-readable memory of server 16. The one or more predetermined validity criteria can include criteria descriptive of valid identity information but different than the valid identity information. For instance, the validity criteria can include a predetermined range of unique identification numbers (e.g., a predetermined range of ISMI numbers), a predetermined number of digits of an identification number (e.g., 15 digits, or other numbers of digits), a predetermined range of letters (e.g., for an alphanumeric string), a predetermined checksum value, or other validity criteria that are descriptive of valid identity information but different than the identity information. As such, server 16 can validate identity information of pump controller 12 and/or other pump controllers without requiring that server 16 store a set of predetermined valid identity information (e.g., predetermined valid identification numbers). In some examples, server 16 can store (e.g., in database 22 or other computer-readable memory of server 16) the validation code that may be included with the identity information, but which is not unique to any one pump controller. In such examples, server 16 can validate the identity information in response to determining that the identity information satisfies the one or more predetermined validity criteria, and that the validation code matches the validation code stored by server 16. Accordingly, server 16 can validate the identity information without the added complexity and associated implementation and management cost of public key infrastructure (PKI) utilizing, e.g., certificate management techniques.

Authentication credentials are generated by the server in response to validating the identity information (Step 44). For example, server 16 can generate authentication credentials including, e.g., an identity code (often referred to as a user name) that is unique to pump controller 12 and a password. The authentication credentials can be utilized (e.g., required) by server 16 for establishing a second communication connection with pump controller 12, such as by requiring that any subsequent request for a second connection with, e.g., MQTT server 24, be accompanied by the authentication credentials to establish the second connection. Server 16 can refrain from generating and transmitting the authentication credentials in response to determining that the received identity information does not satisfy the one or more predetermined validity criteria, thereby helping to ensure that authentication credentials are not transmitted to devices that are not identified as a valid pump controller device. Each of the identity code and password can be textual, numeric, or alphanumeric strings, randomly generated or generated from a predefined list of authentication credentials, and including any one or more characters. Server 16 can check the identity code for uniqueness (i.e., against other identity codes stored by server 16) to ensure that no two pump controllers are associated with a same identity code. Server 16 can associate the identity code and password with the identity information of pump controller 12, such as in database 22.

The authentication credentials are transmitted from the server to the pump controller via the first connection (Step 46). For example, web server 20 can transmit the authentication credentials to pump controller 12 via the first connection between pump controller 12 and web server 20. The authentication credentials are received by the pump controller from the server via the first connection (Step 48). For instance, pump controller 12 can receive the authentication credentials via the first connection between web server 20 and pump controller 12.

The authentication credentials are transmitted from the pump controller to the server via the second connection (Step 50). As an example, pump controller 12 can transmit a connection request to MQTT server 24 via a second connection, the connection request including the authentication credentials. The authentication credentials are received by the server from the pump controller via the second connection (Step 52). For instance, MQTT server 24 can receive the authentication credentials with the connection request from pump controller 12.

The authentication credentials are validated by the server (Step 54). For example, server 16 can compare the authentication credentials (e.g., the identity code and password) received with the connection request to the stored authentication credentials associated with pump controller 12. Server 16 can validate the authentication credentials in response to determining that the received authentication credentials match the stored authentication credentials, and can establish the second communication connection with pump controller 12 in response.

A unique activation code is generated and associated with the pump controller (Step 56). For example, server 16 can generate a unique activation code for pump controller 12 and associate the unique activation code with pump controller 12 in computer-readable memory of server 16, such as in database 22. Server 16 can generate the unique activation code in response to validating the authentication credentials received via the second connection. Server 16 can refrain from generating and/or transmitting the unique activation code for pump controller 12 in response to determining that the authentication credentials received from pump controller 12 to establish the second connection do not match the authentication credentials stored by server 16. The unique activation code can be any textual, numeric, or alphanumeric string, randomly generated or generated from a predefined list of activation codes, and including any one or more characters. In one example, the unique activation code is a 6-digit alphanumeric string. Server 16 can check the activation code for uniqueness (i.e., against other stored activation codes associated with other pump controllers).

In some examples, server 16 can generate the unique activation code such that the activation code excludes visually-similar numbers and letters, such as the letter "B", the number "8", the letter "O", the number "0", the letter "I", the number "1", the letter "S", and the number "5". Server 16, in some examples, can exclude all visually-similar numbers and letters from any activation code, such that no activation code includes any of the numbers "8", "0", "1", and "5" or any of the letters "B", "O", "I", and "S". In this way, server 16 can ensure that the activation code that is displayed by the pump controller does not include any visually-similar numbers and letters within the code, thereby helping to decrease a chance of confusion when the code is visually read by a user and subsequently entered with an activation request. In other examples, server 16 can generate the unique activation code without restriction on the inclusion of visually-similar numbers and letters within the code, but may accept any visually-similar numbers or letters as valid. For instance, server 16 can generate a unique activation code that includes the number "8". In such an example, server 16 can accept, upon validation of the unique activation code" either the number "8" or the letter "B" as a valid entry within the activation code.

The unique activation code is transmitted by the server to the pump controller via the second connection (Step 58). For example, MQTT server 24 can transmit the unique activation code to pump controller 12 via the second connection between MQTT server 24 and pump controller 12. The unique activation code is received by the pump controller from the server via the second connection (Step 60). For instance, pump controller 12 can receive the unique activation code from server 16 via the second connection between pump controller 12 and MQTT server 24. The unique activation code is displayed by the pump controller (Step 62). For example, pump controller 12 can display the unique activation code received from server 16 at display device 30.

FIG. 2B is a flow diagram illustrating example operations to validate the activation code and associate the pump controller with a user account for remote monitoring and control. As illustrated in FIG. 2B, user account login information is transmitted from a user device to the server (Step 64). For example, a user can log into a user account maintained by server 16 via a connection (e.g., an HTTPS connection) between user device 14 and web server 20. The user account login information can include, e.g., a user name and password for the account that uniquely identifies the user account and validates an identity of a user logging into the account (e.g., using the password). In some examples, a user may create an account when none exists prior to logging into the account.

The user account login information is received by the server from the user device (Step 66). For instance, server 16 can receive the user account login information from user device 14 at a webpage generated by web server 20 or using a mobile phone app that accesses web server 20. The user account login information is validated by the server (Step 68). For example, server 16 can maintain (e.g., within database 22), an association between the user accounts (identified by a user name) and passwords associated with the user account. Server 16 can validate the user account login information in response to determining that the user account login information matches user account login information stored within computer-readable memory of server 16, such as at database 22. A user account login confirmation is transmitted by the server to the user device (Step 70). For instance, server 16 can transmit a confirmation that a user has successfully logged into a user account to user device 14 via the webpage generated by web server 20 and accessed by user device 14. The user account login confirmation is received by the user device from the server (Step 72). For example, user device 14 can receive the user account login confirmation from server device 16 via the webpage generated by web server 20 and accessed by user device 14.

User input of the unique activation code is received by the user device (Step 74). For example, user device 14 can receive input of the unique activation code from a user via a user interface of user device 14. That is, in some examples, the user input of the unique activation code can be received by user device 14 after the unique activation code is visually read by a user who reads the unique activation code from display device 30 of pump controller 30. As such, activation of pump controller 12 for remote monitoring and control can, in certain examples, require that a user visit the geographical location of pump controller 12, which is often co-located with pump 18. Such a requirement can increase a level of security of the remote access to pump controller 12 by requiring that a user attempting to gain remote access to pump controller 12 both know the geographical location of pump controller 12 and have physical access to view display device 30 of pump controller 12.

An activation request that includes the unique activation code is transmitted from the user device to the server (Step 76). For example, user device 14 can transmit an activation request including the unique activation code entered by the user to server 16 via a webpage generated by web server 20 and accessed by user device 14. The activation request can be configured to request authorization of remote communications (e.g., monitoring and control communications) with pump controller 12 via the active user account (i.e., the user account to which the user is currently logged in).

The activation request, including the unique activation code, is received by the server from the user device (Step 78). For instance, server 16 can receive the activation request, including the unique activation code, from pump controller 12 via the webpage generated by web server 20 and accessed by user device 14. The activation code is validated by the server (Step 80). For example, server 16 can access the activation code associated with pump controller 12 and stored at, e.g., database 22, and can validate the activation code in response to determining that the received activation code matches the stored activation code.

The server associates the pump controller with the user account in response to validating the activation code (Step 82). For example, server 16 can associate pump controller 12 with the user account to which the user is currently logged in (i.e., the user account via which the activation code was received) within database 22. The activation code is deleted by the server (Step 84). For instance, server 16 can delete (i.e., remove) from computer-readable memory, such as database 22, the unique activation code that was associated with pump controller 12. As such, the unique activation code can be considered a "one time use" code that can be utilized only once for activation of pump controller 12.

FIG. 2C is a flow diagram illustrating example operations to remotely monitor and control the pump controller via a remote device. As illustrated in FIG. 2C, a user device transmits a pump controller command or request via a user account (Step 86). For instance, a user can log into a user account maintained by server 16 by providing, e.g., a user name and password to log into the account via a web page generated by web server 20 using user device 14. The web page can provide control elements that enable the user to request state information of pump 18 or pump controller 12 and/or to transmit commands to pump controller 12 to control operation of pump 18 via user device 14.

The pump controller command or request is received by the server from the user device (Step 88). For example, server 16 can receive the pump controller command or request from user device 14 via the web page generated by web server 20. The server verifies that the user account is associated with the pump controller (Step 90). For instance, server 16 can access database 22 to determine whether pump controller 12 is associated with the user account via which the pump controller command or request was transmitted. Server 16 can deny access to pump controller 12 in response to determining that the user account is not associated with pump controller 12.

In response to determining that the user account is associated with the pump controller, the server transmits the pump controller command or request to the pump controller via the second communication connection between the server and the pump controller (Step 92). For example, server 16 can transmit the pump controller command or request to pump controller 12 via the second communication connection between MQTT server 24 and pump controller 12. The pump controller receives the pump controller command or request from the server via the second communication connection (Step 94). For example, pump controller 12 can receive the pump controller command or request from server 16 via the second communication connection between MQTT server 24 and pump controller 12. The pump controller controls the pump according to the received pump controller command or request (Step 96). For instance, pump controller 12 can control operation of pump 18 according to a received pump controller command, such as by turning pump 18 on or off, controlling pump 18 according to a duty cycle defined by the pump controller command, or other according to other pump controller commands. Pump controller 12, in some examples, can retrieve operational state information of pump 18 in response to a pump controller request.

The pump controller transmits pump state information to the server (Step 98). For example, pump controller 12 can transmit operational state information of pump 18 (or pump controller 12) to server 16 via the second communication connection between pump controller 12 and MQTT server 24. The server receives the operational state information from the pump controller (Step 100). For instance, server 16 can receive the operational state information from pump controller 12 via the second communication connection between pump controller 12 and MQTT server 24. The server transmits the operational state information to the user device (Step 102). For example, server 16 can transmit the operational state information to user device 14 via the webpage generated by web server 20 and accessed by user device 14.

The user device receives the pump state information (Step 104). For instance, user device 14 can receive the pump state information from server 16 via the webpage generated by web server 20 and accessed by user device 14. The pump state information is displayed (Step 106). For example, user device 14 can display the pump state information at a display device of user device 14. The pump state information can be, in some examples, displayed by user device 14 as part of the webpage that is generated by web server 20 and accessed and displayed by user device 14.

As such, a system implementing techniques of this disclosure can authorized a pump controller for remote monitoring and control using a two-part activation scheme that associates the pump controller with a user account without requiring prior knowledge of unique identity information associated with the pump controller. In this way, techniques of this disclosure can increase the ease of use and availability of information corresponding to a pumping system through the remote monitoring and control while maintaining secured access to the pump controller and without the increased time and cost associated with maintaining a database or other list of valid pump controller identity information.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pump controller comprising:
    one or more processors;
    a communication device;
    a display device; and
    computer-readable memory encoded with instructions that, when executed by the one or more processors, cause the pump controller to:
        transmit, to a server, identity information of the pump controller via a first communication connection between the pump controller and the server established using the communication device, wherein the server validates the identity information in response to determining that characteristics of the identity information satisfy one or more predetermined validity criteria that are different than the identity information;
        receive, from the server, authentication credentials for establishing a second communication connection between the pump controller and the server;
        establish the second connection with the server, via the communication device, using the authentication credentials;
        receive, from the server, a unique activation code via the second communication connection;
        display, at the display device, the unique activation code;
        receive remote communications from the server via the second communication connection, the remote communications originating from a remote device;
        control the pump according to operational instructions included in the remote communications; and
        report operational state information of the pump to the server via the second communication connection.

2. The pump controller of claim 1,
    wherein the identity information comprises a unique identification number associated with the pump controller.

3. The pump controller of claim 2,
    wherein the unique identification number comprises a unique identification number of the communication device.

4. The pump controller of claim 1, wherein the authentication credentials comprise:
    a randomly-generated identity code checked for uniqueness by the server; and
    a randomly-generated password associated with the identity code.

5. The pump controller of claim 1,
    wherein the unique activation code comprises an alphanumeric string; and
    wherein displaying the unique activation code comprises displaying the alphanumeric string at the display device.

6. The pump controller of claim 1,
    wherein the second communication connection comprises a lightweight communication connection.

7. The pump controller of claim 6, wherein the lightweight communication connection comprises a communication connection according to Message Queuing Telemetry Transport (MQTT) messaging protocol.

8. A method comprising:
    receiving, by a server, identity information from a pump controller via a first communication connection between the server and the pump controller;
    validating, by the server, the identity information in response to determining that characteristics of the identity information satisfy one or more predetermined validity criteria that are different than the identity information;
    establishing a second communication connection between the server and the pump controller using authentication credentials generated by the server in response to validating the identity information;
    transmitting, by the server, a unique activation code to the pump controller via the second communication connection;
    receiving, by the server, an activation request that includes the unique activation code from a user device associated with a user account;
    authorizing, by the server, remote communication with the pump controller via the user account in response to determining that the activation request includes the unique activation code; and
    controlling, via the pump controller, a pump according to operational instructions included in the remote communications.

9. The method of claim 8,
    wherein the identity information comprises a unique identification code associated with the pump controller.

10. The method of claim 9,
    wherein validating the identity information in response to determining that the characteristics of the identity information satisfy the one or more predetermined validity criteria that are different than the identity information comprises validating the identity information in response to determining that the unique identification code associated with the pump controller is within a predetermined range of numbers and letters.

11. The method of claim 9,
    wherein validating the identity information in response to determining that the characteristics of the identity information satisfy the one or more predetermined validity criteria that are different than the identity information comprises validating the identity information in response to determining that a number of digits of the unique identification code matches a predetermined number of digits.

12. The method of claim 8, wherein the authentication credentials comprise:
    a randomly-generated identity code checked for uniqueness by the server; and
    a randomly-generated password associated with the identity code.

13. The method of claim 8, further comprising:
    generating, by the server, the unique activation code; and
    associating, by the server, the unique activation code with the pump controller in computer-readable memory of the server.

14. The method of claim 13,
wherein the unique activation code comprises an alphanumeric string; and
wherein generating the unique activation code comprises generating the unique activation code such that the unique activation code excludes visually-similar numbers and letters.

15. The method of claim 8,
wherein the unique activation code comprises an alphanumeric string; and
wherein authorizing the remote communication with the pump controller via the user account in response to determining that the activation request includes the unique activation code comprises treating visually-similar numbers and letters as a same character to determine that the activation request includes the unique activation code.

16. The method of claim 8,
wherein the second communication connection comprises a lightweight communication connection.

17. A system comprising:
a pump controller;
a user device; and
a server configured to:
  receive identity information from the pump controller via a first communication connection between the server and the pump controller;
  validate the identity information in response to determining that characteristics of the identity information satisfy one or more predetermined validity criteria that are different than the identity information;
  establish a second communication with the pump controller using authentication credentials generated by the server in response to validating the identity information;
  transmit a unique activation code to the pump controller via the second communication;
  receive an activation request that includes the unique activation code from the user device associated with a user account;
  authorize remote communications with the pump controller via the user account in response to determining that the activation request includes the unique activation code; and
  transmit the remote communications to the pump controller, wherein the remote communications include operational instructions used by the pump controller to control a pump.

18. The system of claim 17,
wherein the pump controller comprises a communication device having a unique identification number; and
wherein the pump controller is configured to transmit the identity information to the server by at least transmitting the unique identification number of the communication device to the server.

19. The system of claim 18,
wherein the server is configured to validate the identity information by at least being configured to validate the identity information in response to determining that the unique identification number of the communication device is within a predetermined range of numbers.

20. The system of claim 17,
wherein the server is configured to generate the unique activation code and associate the unique activation code with the pump controller in computer-readable memory of the server; and
wherein the pump controller is configured to display the unique activation code at a display device of the pump controller.

* * * * *